May 28, 1935.  W. K. CORRELL  2,002,657
WINDSHIELD WIPER
Filed Feb. 8, 1934
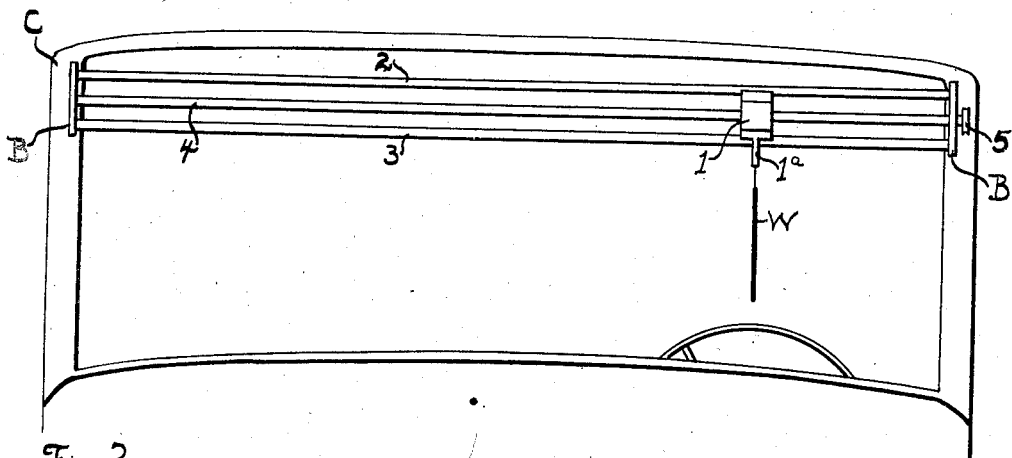
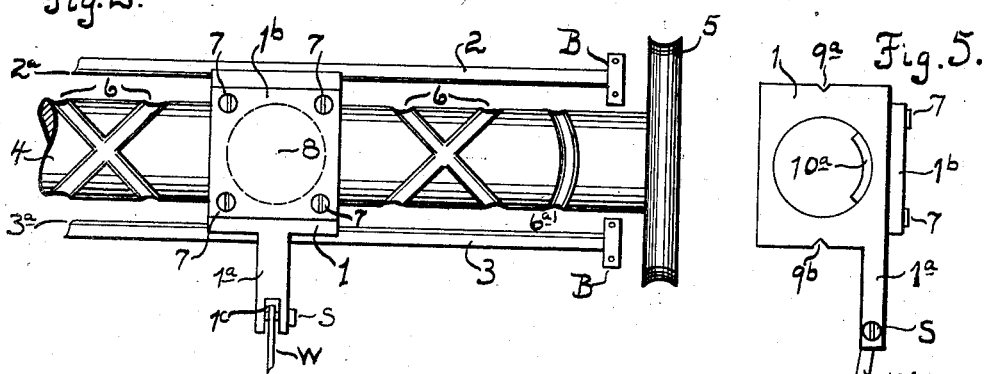
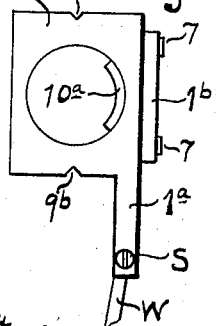
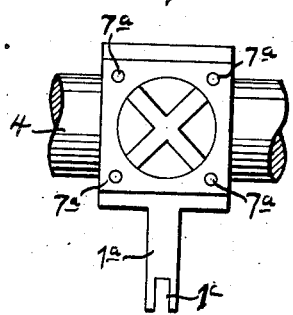
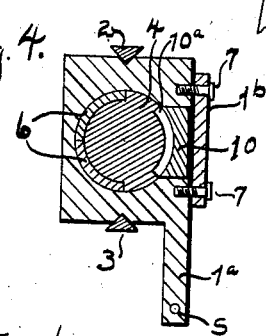
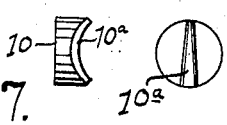
INVENTOR.
William K. Correll
BY F. Lewis Peyton
ATTORNEY Patented May 28, 1935

2,002,657

UNITED STATES PATENT OFFICE 2,002,657

WINDSHIELD WIPER

William K. Correll, Jackson, Miss.

Application February 8, 1934, Serial No. 710,206

1 Claim. (Cl. 74—57)

This invention relates to windshield wipers generally, and particularly to that type of wipers adapted to travel across the entire surface of the glass.

One important object of this invention is to provide a device of this character, which is adapted for use on any type of windshield.

Another object of this invention is to provide a device of this character, which will have a steady stroke from one end of the glass to the other.

A still further object of this invention is to provide a device of this character which is driven by a mechanical means and which is strong and sturdy of construction, and comprising a simple cooperative essential of parts, one embodiment of which is disclosed in the drawing.

In the drawing

Figure 1 is a front view of the automobile windshield with the device mounted thereon.

Figure 2 is a front sectional view of the device.

Figure 3 is a front sectional view of the wiper carrying means with the key removed therefrom.

Figure 4 is a cross sectional view of the wiper carrying means, key disposed therein and drive shaft.

Figure 5 is a side view of the wiper carrying means without a shaft being in connection therewith.

Figure 6 is a front view of the key carried by the wiper carrying means.

Figure 7 is a side view thereof.

Following the drawing in detail, the numeral 1 designates wiper carrying means which is mounted on the tracks 2 and 3, as disclosed in Figures 1 and 2. These tracks 2 and 3 are supported by brackets B—B to either side of the frame C of the windshield, as shown in Figure 1. The wiper supporting means 1, has disposed centrally across the lower and upper sides thereof grooves 9a and 9b, into which are respectively adapted to fit the tracks 2 and 3, as shown in Figures 4 and 5.

A shaft 4 is disposed centrally between the tracks 2 and 3, as shown in Figures 1 and 2, and has at one end thereof a pulley 5, by means of which the shaft 4 is rotated. The means of rotation of this shaft 4 may be by any practical mechanical means for rotating a shaft of this nature. The shaft 4 has extending along its surface cross-spiral grooves 6—6, which terminate at either end of the shaft in a semi-circular groove 6a, and thus a key traveling along one of the spiral grooves 6 will finally reach the grooves 6a where it will start back along the shaft 4 in the cross spiral groove 6.

The wiper support 1, has disposed centrally therethrough the circular opening as shown in Figure 5, through which is adapted to pass the shaft 4, as shown in Figure 4; and thus it is seen that the wiper support 1 as carried by the tracks 2 and 3 has extending centrally therethrough the shaft 4 which is disposed centrally between the tracks 2 and 3.

The wiper support 1 has extending centrally from the front to center thereof a circular opening 8, as shown in Figure 2, into which opening is fitted the key 10. The key 10 is round in shape with the inner side thereof concave and having disposed thereon the tongue 10a as shown in Figures 4, 5, 6 and 7. This tongue 10a of the key 10 is adapted to fit in the groove 6 on the shaft 4; and thus as the shaft 4 rotates the key 10 will travel along the surface of the shaft 4 from one end thereof to the other by following the spiral track 6 in the shaft 4. The key 10 is held in the wiper support 1 against the shaft 4 by a plate 1b, as shown in Figure 2; the plate 1b being fastened to the wiper support 1 by means of screws 7 set in respective screw hole 7a as shown in Figures 2, 3 and 4. Thus it is seen that the key 10 while permanently affixed within the wiper support 1, is permitted to revolve therein, as the tongue 10a follows the groove 6 on the shaft 4.

As the shaft 4 is revolved, the key 10 will follow the grooves 6 therein and thereby carry a wiper support 1 mounted on the tracks 2 and 3 from one end of the shaft 4 to the other and then back again, and so on back and forth as long as the shaft 4 is revolved. By this means the wiper w, mounted at s by the pin 1c on the arm 1a of the wiper support 1, is carried back and forth across the windshield.

The construction, operation and advantages of my invention will, it is believed, be understood and approved by those skilled in the art when the foregoing description has been read in connection with the accompanying drawing. The degree of adjustment of the several members in relation to each other is such as to take care of any requirements; and, while I have here shown and described and pointed out certain novel features of my invention, it is to be understood that various omissions, substitutions and changes in the form and details of the device and its means of operation may be made by those skilled in the art, and that I do not wish to be restricted to the precise structure disclosed, but hold myself entitled to make such changes therefrom as fairly fall within the scope of what I claim.

What I claim is:

In a device of the character described, parallel tracks extending longitudinally across the top of a windshield, a shaft disposed parallel to said bars and adjacent thereto, said shaft having disposed on the surface thereof cross-circular spiral grooves, a housing disposed about said shaft and having extending centrally through the front thereof a circular opening, a key rotatably mounted within said opening of the housing and having disposed on the inner face thereof a tongue adapted to fit within the spiral grooves of said shaft, and a plate disposed on the outer side of said housing and adapted to retain the key within the circular opening of the housing, and longitudinal parallel grooves disposed on the upper and under surfaces of the housing, the longitudinal parallel tracks adapted to fit within said parallel grooves, the housing adapted to travel along the parallel tracks on revolution of the spiral shaft.

WILLIAM K. CORRELL.